3,020,953
Patented Feb. 13, 1962

3,020,953
SECONDARY RECOVERY OF OIL
Werner Zerweck, Frankfurt am Main, Walter Bulian, Frankfurt am Main, Fechenheim, Wilhelm Kunze, Hannover, and Alfred Kiesewetter, Celle, Hannover, Germany, assignors to Wintershall Aktiengesellschaft, Kassel, Germany, and Cassella Farbwerke Mainkur Aktiengesellschaft, Frankfurt am Main, Fechenheim, Germany
No Drawing. Filed Nov. 26, 1957, Ser. No. 698,910
10 Claims. (Cl. 166—42)

The present invention relates to secondary recovery of oil, and more particularly, it relates to a method of and composition for the secondary recovery of oil.

The additional recovery of oil through secondary recovery operations is a task of considerable economic importance.

Apparently exhausted oil bearing formations already have been brought back into production by fluid injection, for instance of aqueous magnesium chloride solution. However, fluid injection with salt solutions of this kind result in poor oil yields since such solutions penetrate the oil and consequently oil of high water content is recovered which then has to be separated from the water at considerable expense.

It has also been proposed to use water soluble organic compounds for fluid injection into oil bearing formations, such as polyglycol-derivatives, saponins, and the like. However, these organic substances do not overcome the above-described disadvantage and furthermore cause strong and undesirable foam formation.

More recently it has been proposed to use for fluid injection purposes solutions of carboxyl groups-containing polymerizates or mixed polymerizates, preferably in the form of alkali metal salts thereof. However, in many cases, these polymerizates cannot be used because water insoluble alkaline earth metal salts thereof are formed and consequently precipitations are formed which plug up the oil bearing formations.

It is therefore an object of the present invention to overcome the above-discussed difficulties in the secondary recovery of oil.

It is another object of the present invention to provide a method of recovery of oil from oil bearing formations which can be carried out in a simple and economical manner and which will achieve secondary oil recovery with a high yield.

It is a further object of the present invention to provide as a new composition of matter a solution adapted to be injected into oil bearing formations to facilitate the oil recovery therefrom.

Other objects and advantages of the present invention will become apparent from a further reading of the description and of the appended claims.

With the above and other objects in view, the present invention mainly comprises in a method of recovery of oil from oil bearing formations, the step of injecting into the oil bearing formation a solution of at least one polyacrylic acid amide.

The present invention also contemplates as a new composition of matter adapted to be injected into oil bearing formations to facilitate oil recovery therefrom, an aqueous solution of a water-soluble salt of at least one cation selected from the group consisting of Na, K, Mg, Ca, Fe and an anion selected from the group consisting of Cl, $HSO_4$, $SO_4$, $HCO_3$, $CO_3$, said salt being present in a concentration of between 20 grams per liter of said solution and its saturation concentration at a temperature of between 0° C. and 55° C., and of at least one polyacrylic acid amide having a K-value of between 75 and 160 and being present in a concentration of between 2 and 50 grams per liter.

Thus, according to the present invention, a polyacrylic acid amide in solution is injected into the oil bearing formation. Thereby, contrary to the difficulties experienced with polyacrylic acid salts, the formation of insoluble calcium or iron salts is avoided and it is thus possible, according to the present invention, to carry out the recovery of oil, particularly the secondary recovery of oil, with much better yields than was heretofore possible.

The polyacrylic acid amides required for the method of the present invention are for instance obtained by reacting a polyacrylic ester with ammonia, or by saponification of acrylonitrile (for instance with 1 mol sulfuric acid and 1 mol water), and polymerization of the thus-obtained acrylic acid amide. This latter method is preferably carried out by means of a redox system whereby the degree of polymerization is controlled by changes of the concentration of the monomeric compounds, of the temperature, and of the redox components, so that polymerization products of the desired degree of polymerization best suited for any particular application (i.e. any particular oil bearing formation) are obtained.

The following Table I summarizes the method of producing polyacrylic acid amides of varying degree of polymerization by a redox process. The degree of polymerization is indicated by the K-value (as for instance described in Fikentscher, Cellulosechemie, volume 13 (1932), page 58), and also by the viscosity of a 1% solution expressed in cp. at 20° C.

TABLE I

| Concentration of monomeric compound | Temp., °C. | pH | Initial [1] redox reagent (in percent of monomer) | Second [2] redox reagent (in percent of monomer) | K value | cp., 1% solution at 20° C. |
|---|---|---|---|---|---|---|
| 10 | 55 | 8.0 | 2.1% Na-hyposulfite | 0.6% K-persulfate | 105 | 6.6 |
| 6.7 | 55 | 8.5 | 0.12% K-persulfate | 1.2% Formaldehyde-sodium-sulfoxylate. | 122 | 11.6 |
| 5 | 40 | 9.0 | 0.18% K-persulfate | 1.8% Formaldehyde-sodium-sulfoxylate. | 137 | 20 |
| 5 | 40 | 9.0 | 0.15% K-persulfate | 1.0% Formaldehyde-sodium-sulfoxylate. | 150 | 34 |
| 5 | 40 | 9.0 | 0.10% K-persulfate | do. | 159 | 48 |

[1] Added at the beginning of the reaction.
[2] Added during polymerization.

The concentration of the polyacrylic acid amide is preferably kept between about 2 grams and 50 grams per liter of the aqueous solution, and most preferably between about 5 and 10 grams per liter.

It has been found, that best results are obtained with polyacrylic acid amides having a K-value of between 105 and 160.

According to the present invention, polyacrylic acid amides of the above-described degree of polymerization, namely having a K-value of between 75 and 160, are used in solutions, either alone or in combination with water soluble inorganic salts such as the salts comprising the cations sodium, potassium, magnesium, calcium or iron in combination with anions such as Cl, $HSO_4$, $SO_4$, $HCO_3$ or $CO_3$. These salts, for instance sodium chloride, potassium chloride, magnesium chloride, calcium chloride or iron chloride, or sodium hydrosulfate, or potassium sulfate, or sodium bicarbonate, or carbonate, or magnesium bicarbonate, or similar water soluble salts, are dissolved preferably in a concentration of not less than 20 grams per liter of the solution which is to be injected into the oil bearing formation. The upper limit of concentration of these salts in the solution is their saturation concentration at the temperature at which the solution is used, which temperature usually ranges between 0° C. and 55° C.

The following Table II lists, as examples only, and without limiting the present invention to the specific details of the examples, several aqueous solutions for injections according to the present invention.

TABLE II

| Ingredients, grams/liter | 1 | 2 | 3 | 4 | 5 | 6 |
|---|---|---|---|---|---|---|
| $FeCl_2$ | 2.2 | 0.9 | 0.1 | 1.4 | | |
| $CaCl_2$ | 30.0 | 14.7 | 2.7 | 20.6 | | |
| $MgCl_2$ | 5.2 | 4.8 | 0.9 | 0.5 | 11.0 | |
| NaCl | 90.0 | 108.0 | 64.0 | 198.0 | 275.0 | |
| KCl | 1.0 | 0.4 | | 23.8 | 8.0 | |
| $Mg(HCO_3)_2$ | | 0.1 | | | | |
| $Ca(HCO_3)_2$ | 0.1 | | 0.4 | | | |
| $MgSO_4$ | 0.6 | | | 0.4 | 11.0 | |
| KBr | 1.8 | | 0.2 | 1.2 | | |
| salt content | 130.9 | 128.9 | 68.3 | 245.9 | 305.0 | 0 |
| specific gravity | 1.10 | 1.09 | 1.05 | 1.15 | 1.19 | 1.0 |
| polyacrylic acid amide | 5.5 | 22.0 | 7.5 | 9.5 | 4.5 | 12 |
| K-value of polyacrylic acid amide | 145 | 80 | 135 | 120 | 160 | 105 |

The secondary recovery effected by the pressing in of an injection liquid is carried out by either introducing this liquid by means of a probe placed in the edge water of the deposit or, preferably, by using a probe which itself has drilled through the oil deposit.

The required new injection agents limited by the claims are mixed with the natural or artificial salt solutions, e.g. the solutions 1-5 given in Table II, before being pressed in. The mixing is done at room temperature by solving the new injection agent in a salt brine, while stirring.

It is, however, possible to use as an artificial salt brine a mineral salt solution saturated at room temperature, e.g. a solution of 315 grams per liter which is saturated at 25° C. For this purpose saturated solutions of various waste salts may be used as well; one of these solutions is specified as No. 5 in Table II. But it is also possible to use the new injection agent only dissolved in fresh water.

It is useful to bring the salt solution, which is employed for the solution of the injection agent to a salt concentration corresponding to the content of adherent water in the deposit.

It is for instance useful to employ the salt solution according to No. 1 of Table II, corresponding to the natural oil water with an addition of 5 grams per liter of polyacrylic acid amide having a K-value of 145 for a deposit ground having a relatively small permeability e.g. of 50 milli-darcy.

In cases where oil water for the preparation of the injection liquid is not available in a sufficient quantity a saturated mineral salt solution may be employed. For deposits with relatively high permeability it is useful to employ the added polyacrylic acid amide of the K-value of 120 in a concentration of 10 grams per liter, solved in a saturated mineral salt solution.

In cases where clay capable of swelling up is present in the deposit, the salt solution is employed in a concentration of 69 grams per liter (Table II, No. 3) for the mixture with the injection agent.

In special cases where the oil water is free of salt it is sufficient to use as injection liquid polyacrylic acid amide dissolved in fresh water, the chosen concentration depending on the permeability; at a high permeability of 1000 m.d. for instance polyacrylic acid amide of a concentration of 45 grams per liter and a K-value of 75 is employed.

The quantities of polyacrylic acid amide listed in Table II are employed at a temperature of 20° C. If the injection process is carried out at a different temperature of deposit, the following quantities of polyacrylic acid amide having the K-value of 145 are necessary in the case of injection liquid 1, in order to obtain an injection liquid of the same viscosity: 5 g. at 15°, 6.1 g. at 30°, 7.2 g. at 40°, and 8.5 g. at 50°.

Another variant of the process is the application of injection liquids of different viscosity values. The injection process may for instance be started with a solution of a viscosity of 25 centipoise at 35° (which may be obtained by the addition of 14 grams per liter of polyacrylic acid amide having a K-value of 145 to a salt solution according to Table II) and the injection may be continued after some time with the same salt solution but without the addition of polyacrylic acid amide. The more viscous solution of polyacrylic acid amide is moved ahead by the salt solution and the polyacrylic acid amide in this combination shows the same efficiency with regard to the displacement of oil from the rock as in its sole employment.

The following examples of the method of the present invention are given as illustrative only, the invention however not being limited to the specific details of the examples.

*Example 1*

233 kilograms of oil bearing sand containing 54 liters of oil were injected for 1 hour with:

(a) A saturated sodium chloride solution containing 5 grams per liter of a polyacrylic acid amide having a K-value of 105;

(b) A saturated sodium chloride solution containing 10 grams per liter of the polyacrylic acid amide used under (a) above; and (c) A saturated sodium chloride solution without addition of a polyacrylic acid amide.

The results of these comparison experiments are summarized in the following table III.

TABLE III

|  | Saturated Sodium Chloride Solution | | |
|---|---|---|---|
|  | polyacrylic acid amide | | |
|  | 5 g./l. | 10 g./l. |  |
| Liquid passing through—liters | 462 | 152 | 500 |
| Oil yield—liters | 25 | 24 | 17 |

As can be seen from Table III, the addition of 5 grams per liter of the polyacrylic acid amide increased the oil yield considerably, i.e. by 50% above the yield which could be obtained with the saturated sodium chloride solution alone.

Furthermore, surprisingly it was found that by increasing the concentration of the polyacrylic acid amide from 5 grams per liter to 10 grams per liter, the total quantity of salt solution which had to be used could be reduced by ⅔, while the oil yield remains substantially the same. Thereby not only a saving of injection liquid is achieved, but one also obtains oil containing considerably less water. Furthermore, in spite of doubling the concentration of the polyacrylic acid amide, the total amount of polyacrylic acid amide which is required is reduced by about ⅓.

Example 2

One portion of oil-bearing sand was injected at 37° C. with (a) The oil water of Table II, No. 4 without an addition of polyacrylic acid amide.

Another portion of the same oil-bearing sand was injected with the same oil water as in (a) but with (b) An addition of 6.5 grams per liter of polyacrylic acid amide of a K-value of 145.

The viscosity of the solution (a) was 0.85 cp. at 37°, that of the solution (b) 9.99 cp. at the same temperature.

With solution (a) the exit of water took place at an oil yield of 23.62%, with solution (b) at a yield of 51.3%, i.e. solution (b) containing polyacrylic acid amide yields the double quantity of oil. If the injection is continued until a ratio of water:oil of 55:1 is reached, the oil yield obtained by solution (a) is 46%, that by solution (b) is 60% of the oil contained in the oil bearing sand. As to the time necessary for the recovery of oil, a 50% yield by means of solution (a) is obtained in 300 minutes and the same yield by means of solution (b) is obtained in 150 minutes, that is to say, in case of (b) only half the time is needed.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of recovery of oil from oil bearing formations, the step of flooding the oil bearing formation with water containing, as a viscosity improving agent, an effective amount of at least one polyacrylic acid amide having a K-value between 75 and 160.

2. In a method of recovery of oil from oil bearing formations, the step of injecting into said oil bearing formation a substantially saturated aqueous sodium chloride solution having dissolved therein between about 2 grams and 50 grams per liter of a polyacrylic acid amide having a K-value between 75 and 160.

3. In a method of recovery of oil from oil bearing formations, the step of injecting into said oil bearing formation an aqueous solution of at least one water soluble salt of a cation selected from the group consisting of Na, K, Mg, Ca, Fe and an anion selected from the group consisting of Cl, $HSO_4$, $SO_4$, $HCO_3$, $CO_3$, said salt being present in a concentration of between 20 grams per liter of said solution and its saturation concentration at a temperature between 0° C. and 55° C., and of between about 2 grams and 50 grams per liter of at least one polyacrylic acid amide having a K-value between 75 and 160.

4. In a method of recovery of oil from oil bearing formations, the step of injecting into said oil bearing formation an aqueous liquid having dissolved therein between about 2 grams and 50 grams per liter of at least one polyacrylic acid amide having a K-value between 75 and 160.

5. In a method of recovery of oil from oil bearing formations, the step of injecting into said oil bearing formation an aqueous solution of at least one water soluble salt of a cation selected from the group consisting of Na, K, Mg, Ca, Fe and an anion selected from the group consisting of Cl, $HSO_4$, $SO_4$, $HCO_3$, $CO_3$, said salt being present in a concentration of between 20 grams per liter of said solution and its saturation concentration, and of between about 2 grams and 50 grams per liter of at least one polyacrylic acid amide having a K-value between 75 and 160.

6. In a method of recovery of oil from oil bearing formations, the step of injecting into said oil bearing formation an aqueous liquid having dissolved therein between about 5 grams and 10 grams per liter of at least one polyacrylic acid amide having a K-value between 75 and 160.

7. In a method of recovery of oil from oil bearing formations, the step of injecting into said oil bearing formation a substantially saturated aqueous sodium chloride solution having dissolved therein about 10 grams per liter of a polyacrylic acid amide having a K-value between 75 and 160.

8. In a method of recovery of oil from oil bearing formations, the step of flooding the oil bearing formation with water containing as a viscosity improving agent an effective amount of at least one polyacrylic acid amide having a molecular weight such that a 1% aqueous solution of the polymer at 60° C. has a viscosity of at least about 8 centipoises.

9. In a method of recovery of oil from oil bearing formations by injecting into said oil bearing formations an aqueous solution of at least one water soluble salt of a cation selected from the group consisting of Na, K, Mg, Ca, Fe and an anion slected from the group consisting of Cl, $HSO_4$, $SO_4$, $HCO_3$, $CO_3$, said salt being present in a concentration of between 20 grams per liter of said solution and its saturation concentration and of between 10 and 50 g. per liter of at least one polyacrylic acid amide having a K-value between 75 and 160, the step of beginning said process of injection with said solution and continuing and finishing it with a solution of said salts only without an addition of polyacrylic acid amide.

10. As a new composition of matter adapted to be injected into oil bearing formations to facilitate oil recovery therefrom, an aqueous solution of a water-soluble salt of at least one cation selected from the group consisting of Na, K, Mg, Ca, Fe and an anion selected from the group consisting of Cl, $HSO_4$, $SO_4$, $HCO_3$, $CO_3$, said salt being present in a concentration of between 20 grams per liter of said solution and its saturation concentration at a temperature of between 0° C. and 55° C., and of at least one polyacrylic acid amide having a K-value of between 75 and 160 and being present in a concentration of between 2 and 50 grams per liter.

References Cited in the file of this patent

UNITED STATES PATENTS

| | | |
|---|---|---|
| 2,731,414 | Binder et al. | Jan. 17, 1956 |
| 2,733,206 | Prussick et al. | Jan. 31, 1956 |
| 2,771,138 | Beeson | Nov. 20, 1956 |
| 2,827,964 | Sandiford et al. | Mar. 25, 1958 |
| 2,842,492 | Von Engelhardt et. al. | July 8, 1958 |

UNITED STATES PATENT OFFICE
CERTIFICATE OF CORRECTION

Patent No. 3,020,953            February 13, 1962

Werner Zerweck et al.

It is hereby certified that error appears in the above numbered patent requiring correction and that the said Letters Patent should read as corrected below.

In the grant, lines 1 to 3, for "Werner Zerweck, of Frankfurt am Main, Walter Bulian, of Frankfurt am Main, Fechenheim, Wilhelm Kunze, of Hannover, and Alfred Kiesewetter, of Celle, Hannover, Germany," read -- Werner Zerweck, of Frankfurt am Main, Walter Bulian, of Barnstorf Kr. Diepholz, Wilhelm Kunze, of Frankfurt am Main, and Alfred Kiesewetter, of Hannover, Germany, --; in the heading to the printed specification, lines 3 to 6, for "Werner Zerweck, Frankfurt am Main, Walter Bulian, Frankfurt am Main, Fechenheim, Wilhelm Kunze, Hannover, and Alfred Kiesewetter, Celle, Hannover, Germany," read -- Werner Zerweck, Frankfurt am Main, Walter Bulian, Barnstorf Kr. Diepholz, Wilhelm Kunze, Frankfurt am Main, and Alfred Kiesewetter, Hannover, Germany, --.

Signed and sealed this 20th day of November 1962.

(SEAL)
Attest:

ERNEST W. SWIDER            DAVID L. LADD

Attesting Officer            Commissioner of Patents